(12) United States Patent
Kumar et al.

(10) Patent No.: US 9,043,810 B2
(45) Date of Patent: May 26, 2015

(54) INTERFACING BETWEEN NATIVE AND WEB APPLICATIONS UTILIZING A MOBILE MODULE

(71) Applicant: Bank of America Corporation, Charlotte, NC (US)

(72) Inventors: Devi Shanmuga Kumar, West Windsor, NJ (US); Paulo Resende, Robbinsville, NJ (US); Manoj Arora, East Brunswick, NJ (US); Venkat Pillay, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 143 days.

(21) Appl. No.: 13/686,572

(22) Filed: Nov. 27, 2012

(65) Prior Publication Data

US 2014/0149998 A1    May 29, 2014

(51) Int. Cl.
   *G06F 9/54*      (2006.01)
   *G06F 21/31*     (2013.01)
   *G06F 9/44*      (2006.01)

(52) U.S. Cl.
   CPC .............. *G06F 21/31* (2013.01); *G06F 9/542* (2013.01); *G06F 2221/2101* (2013.01); *G06F 2221/2117* (2013.01); *G06F 9/4443* (2013.01)

(58) Field of Classification Search
   CPC ....... G06F 9/542; G06F 9/5005; G06F 21/31; G06F 9/4443; G06F 2221/2101; G06F 2221/2117
   See application file for complete search history.

(56) References Cited

U.S. PATENT DOCUMENTS

| | | | |
|---|---|---|---|
| 7,331,035 B2 | 2/2008 | Loos et al. | |
| 7,529,767 B2 | 5/2009 | DeAnna et al. | |
| 7,533,114 B2 | 5/2009 | Neil et al. | |
| 7,546,298 B2 | 6/2009 | Hulaj et al. | |
| 7,899,847 B2 | 3/2011 | Lau et al. | |
| 2004/0158813 A1* | 8/2004 | Xia et al. | 717/116 |
| 2005/0223282 A1* | 10/2005 | Frey et al. | 714/20 |
| 2006/0036941 A1 | 2/2006 | Neil | |
| 2007/0277127 A1* | 11/2007 | Carlson et al. | 715/867 |
| 2008/0155034 A1 | 6/2008 | Chen et al. | |
| 2010/0281475 A1 | 11/2010 | Jain et al. | |

(Continued)

FOREIGN PATENT DOCUMENTS

WO    WO 2006/089387 A1    8/2006    ............... G06F 9/44

OTHER PUBLICATIONS

Rover Apps—Mobile Business App Trends & Topics—*What is a Container App?*, http://roverapps.com/blog/2011/9/5/what-is-a-container-app.html; 2 pgs. Sep. 5, 2011.

(Continued)

*Primary Examiner* — H S Sough
*Assistant Examiner* — Syed Roni
(74) *Attorney, Agent, or Firm* — Michael A. Springs

(57) ABSTRACT

According to one embodiment of the present disclosure, interfacing between a plurality of applications for display on a mobile device includes receiving, by an interface, a request to open a plurality of applications. The plurality of applications are associated with a plurality of business units and comprise one or more native applications and one or more web applications. A processor opens the plurality of applications in a container according to a configuration file. The processor is communicatively coupled to the interface. The container is operable to be displayed on a user interface of the mobile device.

20 Claims, 8 Drawing Sheets

(56) References Cited

U.S. PATENT DOCUMENTS

2011/0258578 A1* 10/2011 Nair et al. .................... 715/788
2012/0036494 A1   2/2012 Gurumohan et al.
2012/0089986 A1   4/2012 Siravara et al.
2012/0210166 A1   8/2012 Bonefas et al.

OTHER PUBLICATIONS http:/www.bitzermobile.com/products—8 pgs, printed Mar. 27, 2013.

* cited by examiner

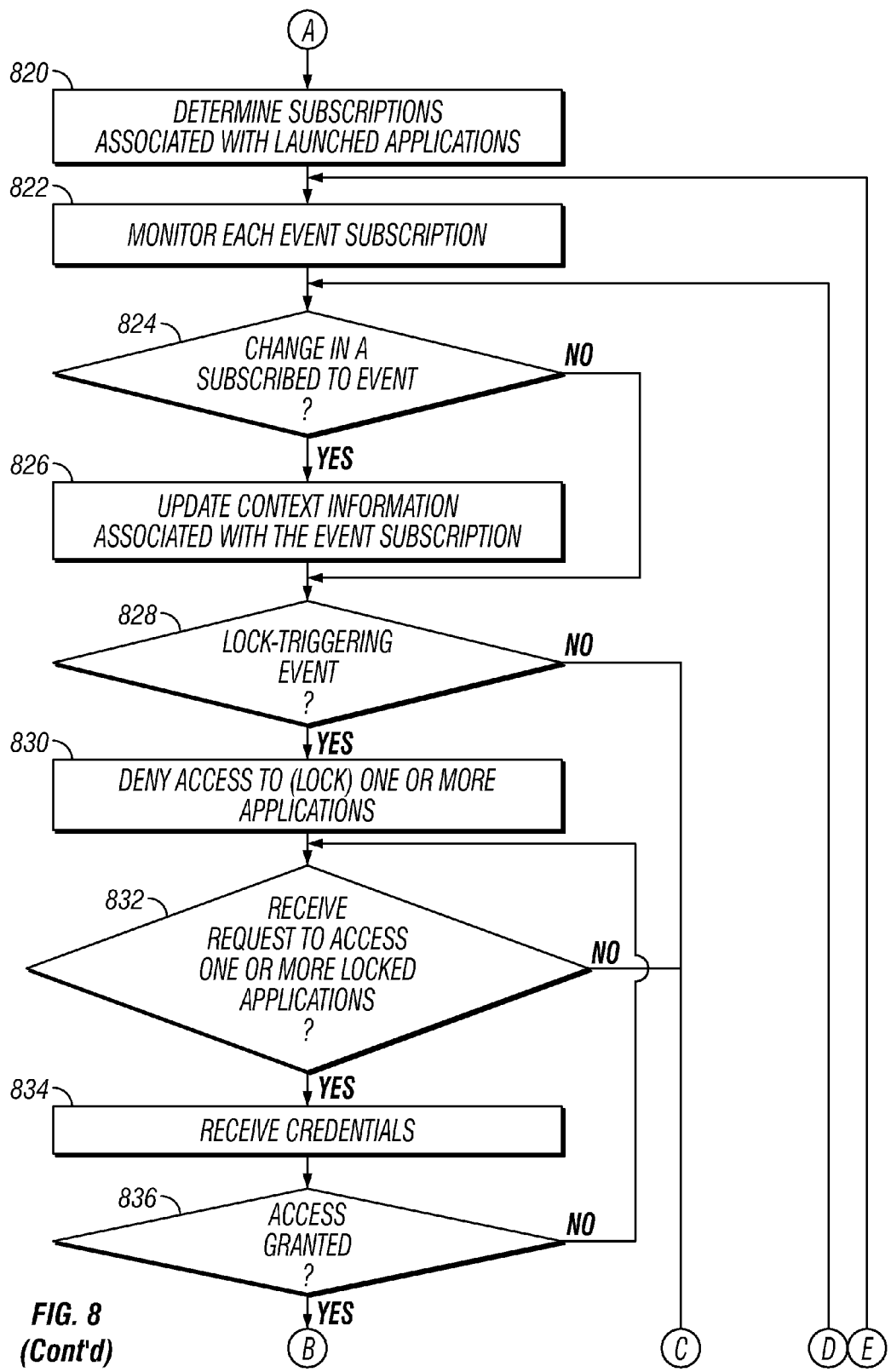

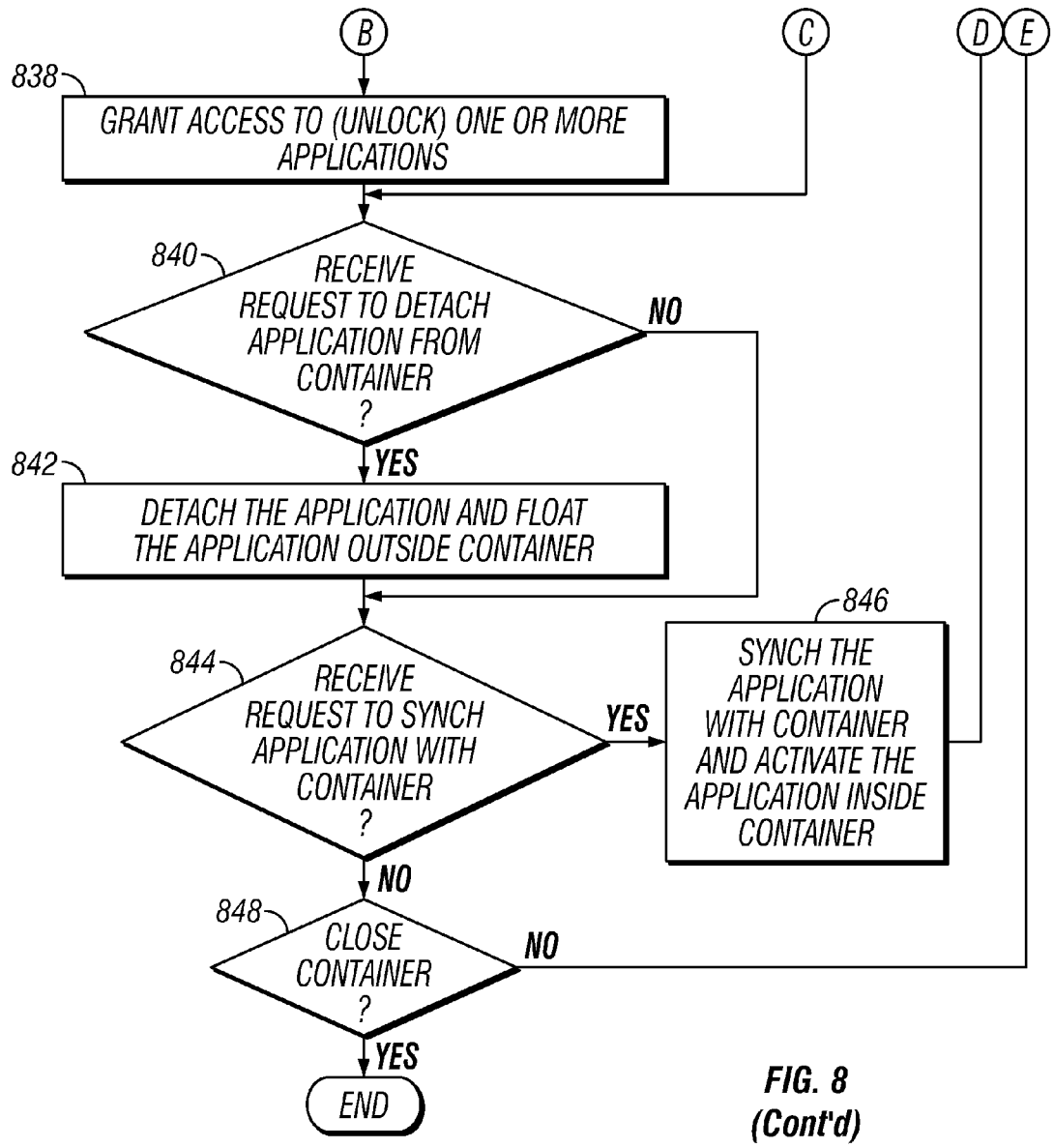

INTERFACING BETWEEN NATIVE AND WEB APPLICATIONS UTILIZING A MOBILE MODULE

TECHNICAL FIELD

This disclosure relates generally to interfacing between various applications and, more specifically, to interfacing between native and web applications utilizing a mobile module.

BACKGROUND

Enterprises use various business applications to perform operations within the enterprise. Within the enterprise, the business applications may include both native and web applications and may utilize application-specific protocols. The business applications only interact with other business applications that use the same protocol. Therefore, business applications that use different protocols are not able to interact.

SUMMARY OF THE DISCLOSURE

In accordance with the present disclosure, disadvantages and problems associated with interfacing, on a mobile device, between native and web applications associated with various business units may be reduced or eliminated.

According to one embodiment of the present disclosure, interfacing between a plurality of applications for display on a mobile device includes receiving, by an interface, a request to open a plurality of applications. The plurality of applications are associated with a plurality of business units and comprise one or more native applications and one or more web applications. A processor opens the plurality of applications in a container according to a configuration file. The processor is communicatively coupled to the interface. The container is operable to be displayed on a user interface of the mobile device.

Certain embodiments of the disclosure may provide one or more technical advantages. A technical advantage of one embodiment includes providing a common interface between native and web applications and the platform. By providing this common interface, standard patterns of application development may be provided, which reduces costs and improves efficiency. The common interface also provides an intuitive way to manage application windows and application content for multiple types of business applications, including both web and native applications. Accordingly, a user may navigate and control a number of native and web applications simultaneously. Another technical advantage of an embodiment includes improving technology integration across various business applications and enabling the consolidation and convergence of various platforms. As mentioned above, this consolidation improves development operations by reducing costs and increasing efficiency. Yet another technical advantage of an embodiment includes supporting communication between applications. Native and web applications share information on the mobile device rather than involving a server, which improves performance and decreases the load on the server and the network. Another technical advantage of an embodiment comprises providing a single, consolidated deployment infrastructure for various platforms. Another advantage includes storing a local log on the device to allow for troubleshooting. Another advantage includes allowing locking one or more applications while keeping one or more other applications active. This may allow users to manage which applications they would like displayed and/or otherwise available to others while still keeping other applications open in the container. This may provide additional security for users who would like to present some information and/or functionality in the container. This may also limit processing resources needed to otherwise close applications for security and later restart the same application for access by the user. This may also allow for the improved efficiency of the container to be maintained by allowing locked applications, although securely locked, to remain in the container to interface and update along with other applications.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1 through 8, like numerals being used for like and corresponding parts of the various drawings.

Enterprises typically include different business units, divisions, or lines of business, that handle different aspects of the enterprise. Each unit may use specific native and/or web applications on a mobile device to handle the information associated with the unit. Even though each unit is different, similar information may be used between the different units. Typically, the units are not able to share information between the different applications and the applications do not work in a coordinated manner, which increases operating costs and reduces efficiency. The teachings of the disclosure recognize that it would be desirable to provide a platform that consolidates different native and web applications on a mobile device based on functionality to improve technology integration between the business units without having to repeat functionality across applications. This platform provides information across various native and web applications, which reduces costs and improves efficiency because a user does not have to identify the common information in each application and repeat the same information across the applications.

Figure 1:
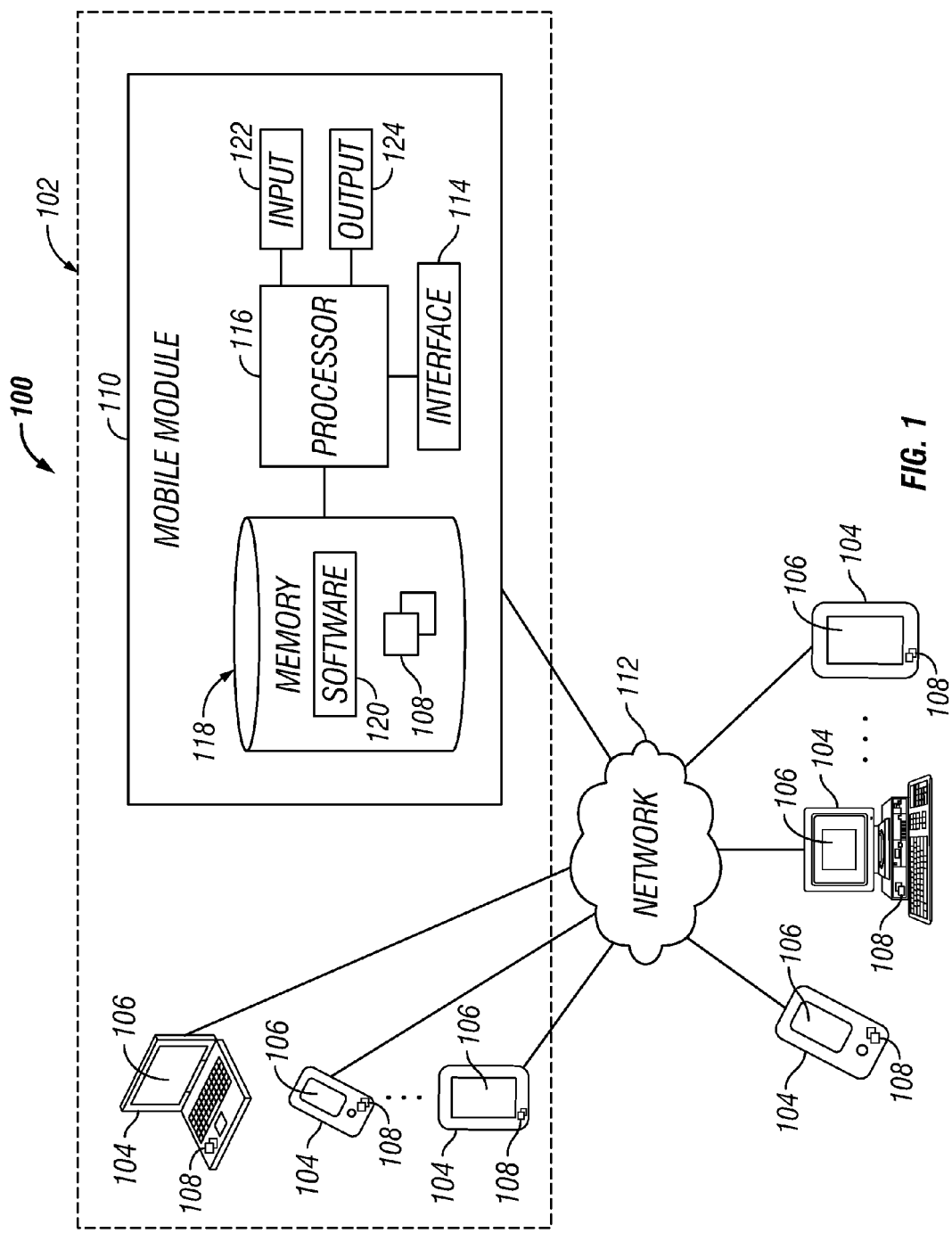
FIG. 1 illustrates a system that facilitates interfacing between various native and web applications utilizing a mobile module, according to one embodiment of the present disclosure.

FIG. 1 illustrates system 100 that facilitates interfacing between various native and web applications 108 utilizing a mobile module 110, according to one embodiment of the present disclosure. System 100 may include enterprise 102, one or more mobile devices 104, and mobile module 110. Enterprise 102, mobile devices 104, and mobile module 110 may be communicatively coupled by network 112. Mobile devices 104 interact with mobile module 110 to facilitate the use of various native and web applications 108.

Enterprise 102 may refer to a financial institution, such as a bank, and may include mobile devices 104 and mobile module 110. Even though enterprise 102 is referred to as a financial institution, enterprise 102 represents any suitable type of entity in any suitable industry. Enterprise 102 may have different business units that handle different business activities. For example, a retirement group, a call center, a wealth management group, and a global financial group represent different business units associated with enterprise 102. Mobile devices 104 within enterprise 102, and the users of those mobile devices 104, may each be associated with different business units. Because of the association with various business units, mobile devices 104 may use different native and web applications 108 to facilitate work in the line of business. Mobile module 110 facilitates the integration of native and web applications 108 between the different business units.

Mobile devices 104 communicate with mobile module 110 to manage native and web applications 108. As illustrated, mobile device 104 may be within enterprise 102 or outside of enterprise 102. Mobile devices 104 may include a laptop, a tablet computer, a wireless or cellular telephone, an electronic notebook, a personal digital assistant, or any other device that is mobile and capable of receiving, processing, storing, and/or communicating information with other components of system 100. A user of mobile device 104 may initiate application 108 and manage application 108 based on the user's preferences. Mobile device 104 may also comprise a user interface, such as a display, a microphone, keypad, a touch screen, or other appropriate terminal equipment usable by a user.

Mobile devices 104 include any necessary hardware and software suitable to carry out their functions. For example, mobile devices 104 may include a processor for executing routines associated with receiving a request to open container 202. A processor included in mobile device 104 may comprise a programmable logic device, a microcontroller, a microprocessor, any suitable processing device, or any suitable combination of the preceding. Mobile devices 104 may also include a memory comprising a non-transitory computer-readable medium for storing software and data related to those software programs. Similarly, data may be input from a user and stored on mobile devices 104 in such a memory. Where appropriate, mobile devices 104 may include a network interface to implement communication protocols to allow mobile device 104 to communicate with the other components of system 100.

Mobile devices 104 may include any suitable software to carry out its functions. For example, mobile devices 104 may run any suitable operating system such as WINDOWS, MAC-OS, UNIX, LINUX, iOS, Windows Mobile, Android, and/or any other suitable operating system. Mobile devices 104 may also include any suitable native applications, such as a web browser application, a messaging application, and/or a natively-installed client application specifically configured to work with one or more components of system 100.

In the illustrated embodiment, mobile device 104 includes a graphical user interface ("GUI") 106 that displays information associated with native and web applications 108 and information received from mobile module 110. GUI 106 is generally operable to tailor and filter data entered by and presented to the user. GUI 106 may provide the user with an efficient and user-friendly presentation of information using a plurality of displays having interactive fields, pull-down lists, and buttons operated by the user. GUI 106 may include multiple levels of abstraction including groupings and boundaries. It should be understood that the term GUI 106 may be used in the singular or in the plural to describe one or more GUIs 106 in each of the displays of a particular GUI 106.

Mobile device 104 also includes one or more native and web applications 108. Application 108 represents any suitable software or logic that allows a user to analyze and/or process information for a customer or client. For example, application 108 may include a web application, a native application, a generic application, a routine application, a third-party application, a high-on-demand application, an application associated with a business unit, or any other future application types. According to an embodiment, native and web applications 108 associated with different business units may be integrated using mobile module 110. Each application 108 to be hosted within a mobile container may follow a specific application-integration guideline. Each application 108 may be hosted within its own particular compartment of mobile module 110. Each application 108 may implement a standard protocol and may get notified of different life-cycle events, application-state events, and user information via one or more implemented protocol methods. Native and web applications 108 may be loaded using one or more configuration files managed by mobile module 110.

Native and web applications 108 may include or utilize a mobile framework The mobile framework may be an abstraction layer that is built upon an existing operating system framework to provide common software components and services that can be leveraged by all types of applications 108, whether native or web, developed by enterprise 102. Application developers may design applications 108 to utilize components provided by the framework. The mobile framework in mobile module 110 may facilitate interfacing between one or more web and one or more native applications 108. The mobile framework may facilitate this by utilizing an object model to represent native capabilities offered in web applications 108 and intercepting URL requests for any requests back to the native container. The object model may be highly extensible to support native capabilities for web applications 108. For example, web application 108 utilizing the mobile framework may include a module that generates a URL request. Application 108 may include a module to intercept the URL command and interpret it as a native-capability request. Application 108 may also include a module that, as a result, requests a native command from the mobile framework Application 108 may have a module that executes the command and performs a callback to the module that generated the URL request. This may provide one or more technical advantages, including allowing a web application 108 to use the mobile framework to interface with native applications 108.

Mobile module 110 represents any suitable component that facilitates the use of native and web applications 108 associated with different business units by mobile devices 104. Mobile module 110 enables high-performing, highly-scalable, technology-independent application development and deployment. To facilitate this process, mobile module 110 delivers configurable mobile containers, which will be discussed in greater detail in FIG. 2, that integrate various native and web applications 108. Mobile module 110 may include an application-integration layer for integrating native and web applications 108.

Mobile module 110 may include a network server, any suitable remote server, a mainframe, a host computer, a workstation, a web server, a personal computer, a file server, or any other suitable device operable to communicate with mobile devices 104 and process data. In some embodiments, mobile module 110 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of mobile module 110 may be performed by any suitable combination of one or more servers or other components at one or more locations. In the embodiment where mobile module 110 is a server, the server may be a private server, and the server may be a virtual or physical server. For example, mobile module 110 may be local to enterprise 102 or remote to enterprise 102. Also, mobile module 110 may include any suitable component that functions as a server. In the illustrated embodiment, mobile module 110 includes interface 114, processor 116, memory 118, input 122 and output 124.

Interface 114 represents any suitable device operable to receive information from network 112 and/or mobile devices 104, transmit information through network 112, perform processing of information, communicate to other devices, or any combination of the preceding. For example, interface 114 communicates event information associated with native and web applications 108 to mobile devices 104. Interface 114 represents any port or connection, real or virtual, including any suitable hardware and/or software, including protocol conversion and data processing capabilities, to communicate through network 112 that allows mobile module 110 to exchange information with mobile devices 104, or other components of system 100.

Processor 116 communicatively couples to interface 114, memory 118, input 122 and output 124, and controls the operation and administration of mobile module 110 by processing information received from interface 114, memory 118, input 122, and output 124. Processor 116 includes any hardware and/or software that operates to control and process information. For example, processor 116 executes software 120 to service mobile devices 104 and manage native and web applications 108. Processor 116 may be a programmable logic device, a microcontroller, a microprocessor, any suitable processing device, or any suitable combination of the preceding.

Memory 118 stores, either permanently or temporarily, data, operational software, or other information for processor 116. Memory 118 includes any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. While illustrated as including particular modules, memory 118 may include any suitable information for use in the operation of mobile module 110.

In the illustrated embodiment, memory 118 includes software 120 that facilitates the provision of service to mobile devices 104 and the management of native and web applications 108. Software 120 represents any suitable set of instructions, logic, or code embodied in a computer-readable storage medium. Memory 118 may also include applications 108 for use by mobile devices 104.

Network 112 represents any suitable network operable to facilitate communication between the components of system 100 such as enterprise 102, mobile devices 104, and mobile module 110. Network 112 may include any interconnecting system capable of transmitting audio, video, signals, data, messages, or any combination of the preceding. Network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an exemplary embodiment of operation, mobile module 110 receives a request to launch application 108. As discussed with respect to FIG. 2, application 108 may be opened in a container, which facilitates the use of applications 108 associated with different business units and different types (including native and web) in a single framework. A user associated with mobile device 104 may configure the layout of native and web applications 108 within the container according to a user's preference or according to the preference of the user's business unit. When opened within the container, application 108 may also subscribe to various events and receive notifications of changes that occur with the event. This allows both native and web applications 108 across multiple business units to receive updated information based on the subscription without users having to manually update information associated with events.

Modifications, additions, or omissions may be made to system 100 without departing from the scope of the disclosure. For example, mobile devices 104 may internally include the functionality of mobile module 110 and not have to interact with a separate component. Additionally, system 100 may include any number of mobile devices 104, mobile modules 110, and networks 112. Any suitable logic may perform the functions of system 100 and the functions of components within system 100.

Any suitable component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Figure 2:
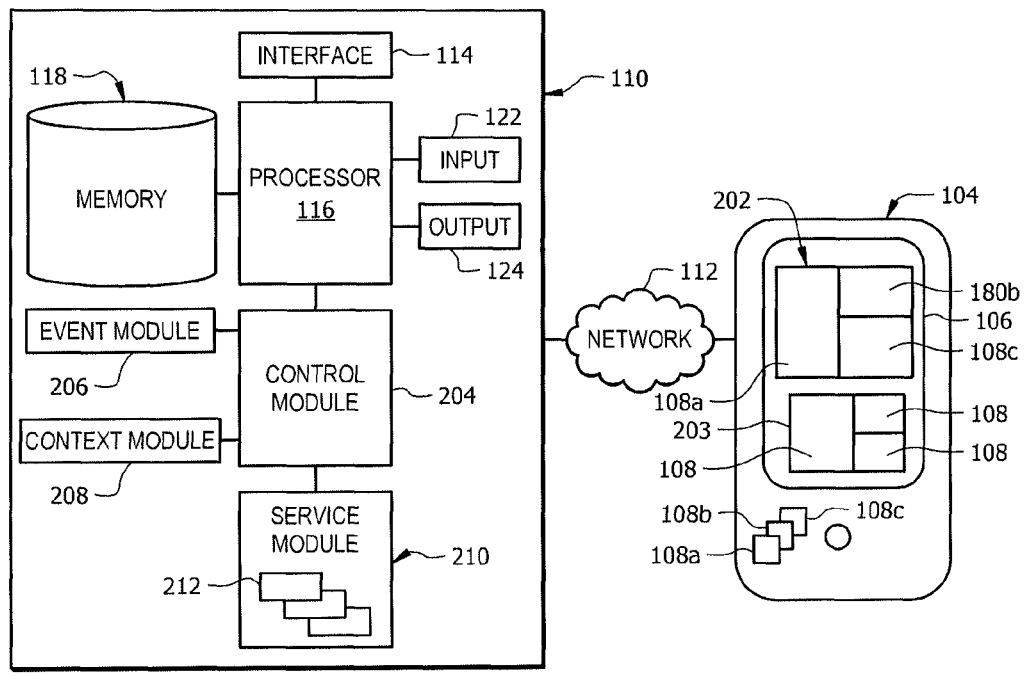
FIG. 2 illustrates a particular embodiment of a mobile module that facilitates interfacing between various native and web applications, according to one embodiment of the present disclosure.

FIG. 2 illustrates a particular embodiment of mobile module 110 that facilitates interfacing between various native and web applications 108, according to one embodiment of the present disclosure. In the illustrated embodiment, applications 108a-108c are running on mobile device 104 and are displayed within container 202.

Container 202 represents a management component that provides unified access to and display of native and web applications 108 related to various business units within enterprise 102. A user may configure container 202 to display native and web applications 108 in any suitable layout as determined by the user. Container 202 supports native applications, web applications, generic applications, routine applications, third-party applications, high-on-demand applications, applications associated with each business unit, or any other future application types. Container 202 also supports communication between native and web applications 108. For example, container 202 enables data and event sharing between native and web applications 108.

Mobile device 104 may launch any suitable number of containers 202. In an embodiment, mobile device 104 may launch two separate instances of container 202 that do not interact. In another embodiment, mobile device 104 may launch multiple instances of container 202 and the instances may interact and share information. Any configurable number of native and web applications 108 may be launched inside container 202. For example, container 202 may launch six different applications 108, concurrently, which use different protocols, languages, or formats and which may include one or more native applications 108 and one or more web applications 108.

The various native and web applications 108 associated with container 202 may run within container 202 or may run outside of container 202. For example, applications 108 running within container 202 are visible on container 202. While applications 108 running outside of container 202 are not visible on container 202 and are detached, these applications 108 may continue to interact with mobile module 110. To manage and service native and web applications 108 associated with container 202, mobile device 104 interacts with mobile module 110.

As discussed above, mobile device 104 may interact directly with mobile module 110 or may interact with mobile module 110 over network 112. Mobile module 110 facilitates the interaction of a plurality of native and web applications 108 associated with various users and business units in enterprise 102. In an embodiment, mobile module 110 facilitates a user customizing container 202 and applications 108 within container 202. In another embodiment, mobile module 110 facilitates remote customization of container 202 and native and web applications 108 within container 202 using an online management tool. In yet another embodiment, mobile module 110 allows users of native and web applications 108 to subscribe to events and to receive the context of events as updates occur. In addition to the components described in FIG. 1, mobile module 110 may include control module 204, event module 206, context module 208, and service module 210 to facilitate interaction with mobile device 104.

Control module 204 interacts with native and web applications 108 to provide services from mobile module 110 and to facilitate the interaction of event module 206, context module 208, and service module 210 with native and web applications 108. In some embodiments, native and web applications 108 may not use control module 204 to access the services provided by mobile module 110. For example, a high-on-demand application 108 may not use control module 204. In an exemplary embodiment, control module 204 may be implemented as an ACTIVEX® control. Control module 204 may be run within container 202 or outside container 202.

Control module 204 may include various interfaces to facilitate the interaction between native and web applications 108 and the other components within mobile module 110, but interacts directly with service module 210. For example, control module 204 includes a messaging interface that allows native and web applications 108 to subscribe to various events and/or contexts and allows event module 206 and context module 208 to publish information associated with the events and contexts. As another example, control module 204 may include a context interface, which represents memory that stores context information. The context interface may store the information for mobile module 110 to quickly access when publishing information to native and web applications 108. Control module 204 may also include interfaces for native and web applications 108 integrated within mobile module 110 and interfaces for native and web applications 108 running in a process separate from mobile module 110.

Native and web applications 108 register with event module 206 and context module 208 to subscribe to events and to receive the context information associated with the events. This subscription capability allows each application 108 to be subscribed to the event and to receive updated context information without having to manually update each application 108 with the context information. Event module 206 and context module 208 facilitate the subscription and publication of events and the provision of context information associated with the events.

Event module 206 communicates events between native and web applications 108 and mobile module 110. Additionally, event module 206 facilitates native and web applications 108 subscribing to events and facilitates the publication of events by mobile module 110 and/or applications 108. The events may be published and/or subscribed to asynchronously and/or simultaneously. Event module 206 may communicate notifications to a currently active application 108 within container 202, and a detached application 108 running outside of container 202 may receive the notification once a user reactivates detached application 108. If a detached application 108 has multiple events to receive, event module 206 may deliver the multiple events in a single notification message. Active and detached applications 108 may publish events to event module 206. Events may include occurrences in market news, occurrences with market data, occurrences with a customer account, or any other suitable occurrence. When a subscribed event changes, application 108 receives the updated context information from event module 206.

Context module 208 manages context information across native and web applications 108. Context module 208 represents hierarchical memory files to store context information. The context information may include information received from a mainframe, which facilitates localized and fast availability of data for event notification. The context information may include a client identifier, a client name, account information, address information, data regarding markets, currency information, language information, symbol information, a high net worth indicator, or other suitable information that application 108 may use.

Service module 210 represents a component that facilitates the provision of services to container 202, such as providing event notification and context information to native and web applications 108. In the illustrated embodiment, service module 210 includes configuration files 212, which store information about the events to which native and web applications 108 subscribe and store information about the context elements associated with the events. Configuration files 212 may also store the settings associated with the layout of containers 202 and native and web applications 108. Configuration files 212 may include settings associated with a user's credentials, a user's entitlements, or a particular business unit, which allows container 202 to start up in the layout configured by the user or the business unit. Storing the settings in configuration file 212 improves the start-up time of containers 202 and native and web applications 108. Configuration files 212 may also store configuration information associated with mobile module 110. Configuration files 212 may include eXtensible Markup Language (XML) configuration files.

A component of mobile module 110 may include an interface, logic, memory, and/or other suitable element. An interface receives input, sends output, processes the input and/or output, and/or performs other suitable operation. An interface may comprise hardware and/or software. Logic performs the operation of the component, for example, logic executes instructions to generate output from input. Logic may include hardware, software, and/or other logic. Logic may be encoded in one or more tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to mobile module 110 without departing from the scope of the disclosure. For example, mobile module 110 may include one or more adapters that facilitate the translation of information between different protocols. In an embodiment, a CICERO® adapter may be used to facilitate communication between the components within mobile module 110, between mobile module 110 and container 202, or between mobile module 110 and applications 108. As another example, mobile module 110 may include a remote installer that creates an installation log, rather than having the configuration information stored on mobile device 104. As yet another example, the functions of control module 204, event module 206, context module 208, and/or service module 210 may be performed by any suitable combination of one or more servers or other components at one or more locations. In the embodiment where the modules are servers, the servers may be public or private servers, and each server may be a virtual or physical server. Also, modules 204, 206, 208, and 210 may include any suitable component that functions as a server.

Figure 3:
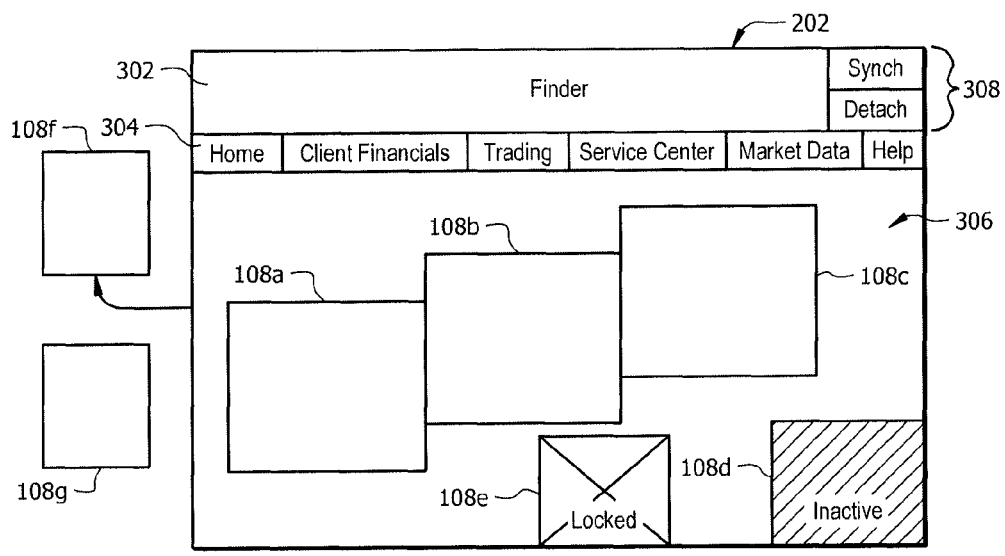
FIG. 3 illustrates an example embodiment of a container that provides an interface between various native and web applications, according to one embodiment of the present disclosure.

FIG. 3 illustrates an example embodiment of container 202 that provides an interface between various native and web applications 108, according to one embodiment of the present disclosure. Container 202 may include applications 108, toolbar 302, navigation menu 304, workspace 306, and application menu 308.

As described above, applications 108 represent different applications that may have different protocols, formats, or programming languages, are associated with different business units, and include native and web applications. In an embodiment, applications 108 may be launched outside of container 202 to interact with mobile module 110 and receive services, such as event notifications and context information. Applications 108 launched outside of container 202 are controlled by other mechanisms provided on mobile device 104. In another embodiment, applications 108 may be launched within container 202 to interact with mobile module 110 and receive the services. While container 202 may control applications 108 launched within it, different instances of applications 108 may exist. Applications 108 may be active and attached to container 202, as illustrated by applications 108a, 108b, and 108c; applications 108 may be inactive and attached to container 202, as illustrated by application 108d; applications 108 may be locked, as illustrated by application 108e; applications 108 may be detached and floating outside container 202, as illustrated by application 108f; or applications 108 may operate in a distinct instance separate from container 202, as illustrated by application 108g.

When application 108d is inactivated, application 108 loses the previous viewable prominence within container 202, and may be grayed out or placed in the background of container 202. A user may activate an inactive application 108 by moving a pointer on or over the inactive application 108, clicking on the inactive application 108, or performing any other suitable action.

When application 108e is locked, application 108 loses the previous viewable prominence within container 202, and may be grayed out or placed in the background of container 202. Application 108 may become locked in response to a user-initiated request to lock application 108, in response to a time-out procedure, or by any other suitable process. For example, a user of mobile device 104 running container 202 may have various native and web applications 108 open in container 202 and may want to allow a customer to view and/or interact with all of the various applications 108 except one. The user may choose an option to lock application 108 that user does not want available to the customer and application 108 may become locked as a result. Additionally or alternatively, application 108 may have settings that indicate that it should be locked after a specific amount of time of mobile device 104, container 202, and/or application 108 being idle. A user may stop using mobile device 104, container 202, and/or application 108 for longer than the specified amount of time and, in response, mobile module 110 may lock application 108.

A user may unlock a locked application 108 by moving a pointer on or over the locked application 108, clicking on the locked application 108, or performing any other suitable action, and successfully completing a security procedure to unlock the locked application 108. For example, a user may indicate a request to unlock locked application 108 by moving a pointer on or over locked application 108. The request may be communicated to mobile module 110. In response to receiving the request, mobile module 110 may provide a prompt for the user to enter a username and password or any other suitable information for a security procedure. If the user successfully completes the security procedure, mobile module 110 may unlock the locked application 108.

An active application 108 attached to container 202 is controlled by container 202. Likewise, an inactive application 108 attached to container 202 is controlled by container 202 and a locked application 108 is controlled by container 202. Container 202 may also control a detached application 108 floating outside container 202. However, application 108 may run in a process separate from container 202, similar to an application 108 initially launched outside container 202.

Active, inactive, and locked applications 108 may interact with mobile module 110, but in different ways. For example, mobile module 110 communicates event notifications and context information to update an active application 108 upon the event occurring. Alternatively, mobile module 110 does not release event notifications and context information to an inactive application 108 until application 108 becomes active again or to a locked application 108 until application 108 becomes unlocked again. A detached application 108 floating outside container 202 may receive event notifications and context information upon synching up with container 202 and becoming active.

A user may configure native and web applications 108 to be displayed within container 202 in any suitable manner. In an embodiment, a user may group native and web applications 108 in workspace 306. Workspace 306 represents a preconfigured layout including one or more native and web applications 108. For example, if applications 108a, 108b, and 108c are used together for a particular business unit, a user may define workspace 306 to include applications 108a, 108b, and 108c. When needed, the user may activate applications 108a, 108b, and 108c by selecting workspace 306. Any suitable number of workspaces 306 may be configured for various business units or users. For example, a financial advisor may use a standard workspace 306, a branch operations user or manager may use an operations workspace 306, a call-center user may use a call-center workspace 306, and a home-office user may use a home-office workspace 306. In an embodiment, each workspace 306 has associated entitlement settings that apply particular rules as to the information available to a user. These entitlement settings may be based on the business unit or a user's role within the business unit.

Toolbar 302 may include information associated with a particular business unit. For example, toolbar 302 may include applications 108 associated with the business unit, search bars to launch mainframe transactions, commands to facilitate working in application 108, shortcuts, or other suitable information to facilitate a user's work in container 202.

Navigation menu 304 represents a menu that allows a user to navigate to different information. In the illustrated embodiment, navigation menu 304 includes various options such as "Home," "Client Financials," "Trading," "Service Center," "Market Data," and "Help." A user may select the desired information to receive from navigation menu 304. Navigation menu 304 may be configured according to the requirements of a business unit. In other embodiments, navigation menu 304 may also include user preferences, research, shortcuts, workspace layout, market tools, business unit specific options, or other suitable options that facilitate a user's interaction with container 202.

Application menu 308 represents a menu or other suitable interface that allows a user to cause application 108 to detach from container 202 or synch up with container 202. The detached option may cause application 108 to become inactive and float outside container 202, while continuing to run on the same process. Detached application 108 would not be viewable on container 202, but would float outside container 202. Additionally, detached application 108 does not receive updates regarding events or context information until the detached application 108 is synched up with container 202 and again becomes active. The synch option causes application 108 to appear within container 202 and become activated within container 202. Application 108 synched with container 202 is viewable within container 202, and receives event notifications and updated context information. A user may highlight application 108 on which to perform the action, and then click or press either the synch button or the detach button on container 202 to perform the desired operation.

Modifications, additions, or omissions may be made to container 202. For example, container 202 may also include a sidebar that includes information particular to the business unit. This information may include particular applications 108 associated with the business unit, such as market tools, markets and investments, client information, and research information. As another example, application 108 may be configured to respond to events associated with container 202, changes in context information, or event notifications. Application 108 may respond to the information according to preconfigured rules.

Figure 4:
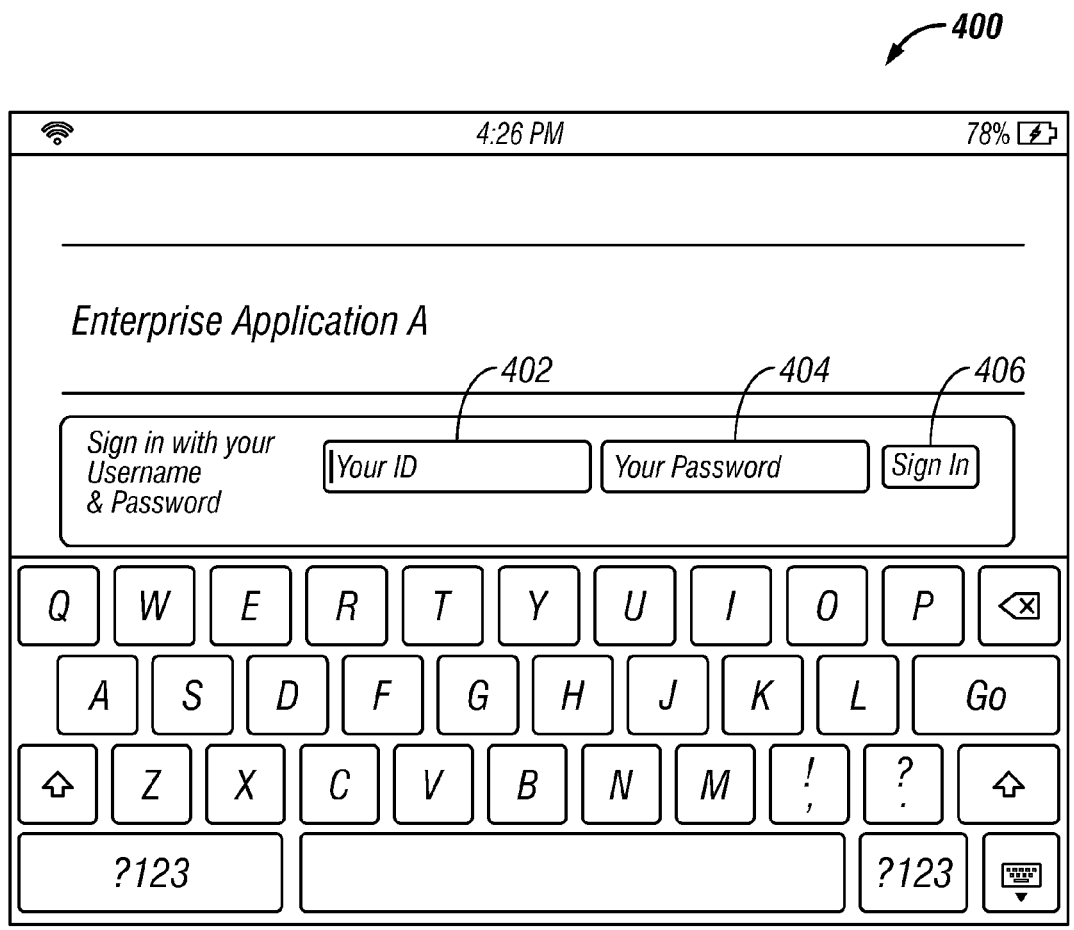
FIG. 4 illustrates an example embodiment of a GUI operable to allow a user to input credentials, according to one embodiment of the present disclosure.

FIG. 4 illustrates an example embodiment of GUI 400 operable to allow a user to input credentials, according to one embodiment of the present disclosure. In certain embodiments, GUI 400 may be an example of GUI 106 of FIG. 1. Credentials may include a username, password, domain, and any other suitable information. GUI 400 may appear on mobile device 104 in response to a request to access particular application 108 in container 202. For example, a user may request to access particular application 108 by clicking on an icon on GUI 106 associated with particular application 108. In response to that request, GUI 400 may appear and prompt the user to enter credentials. Additionally or alternatively, GUI 400 may appear on mobile device 104 in response to a request to access multiple particular applications 108 in container 202. For example, a user may request to access multiple particular applications 108 by selecting icons on GUI 106 associated with multiple particular applications 108. In response to that request, GUI 400 may appear and prompt the user to enter credentials. ID field 402 may be a field for entering a username or other identification for accessing particular application 108. In particular embodiments, the user may enter an email address in ID field 402. Password field 404 may be a field for entering a password associated with the user. The password may be a combination of letters, numbers, and/or symbols previously chosen by or assigned to the user.

Sign-in button 406 may be a button that the user may click or "press," after selecting and/or entering information in ID field 402 and password field 404 in order to prompt container 202 to process the entered information. Container 202 may process the entered information and may allow or deny access to particular one or more applications 108 or perform any suitable action. Container 202 may be operable to grant access to a first user at a first time and deny access to a second user at a second time based on the entered information. For example, a first user may enter valid credentials and container 202 may, as a result, grant access to one or more applications 108. After some time, mobile device 104 may be left idle or the first user may actively sign out of one or more of the one or more applications 108 so that mobile device 104 locks one or more applications 108. A second user may attempt to access the one or more locked applications 108 in container 202 by entering invalid credentials. As a result, container 202 may deny access to the one or more locked applications 108.

Modifications, additions, or omissions may be made to GUI 400 without departing from the scope of the disclosure. For example, GUI 400 may include more or fewer fields and/or buttons.

Figure 5A:
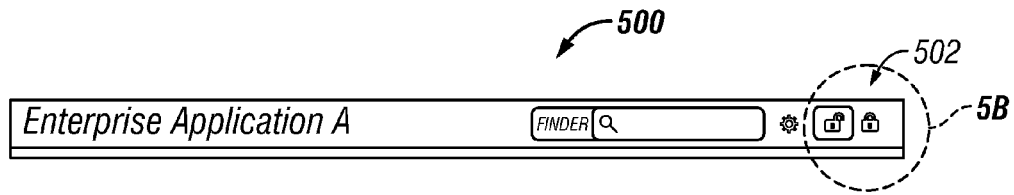
FIG. 5A illustrates an example embodiment of a toolbar for a particular application opened in a container, according to one embodiment of the present disclosure.

FIG. 5A illustrates an example embodiment of toolbar 500 for particular application 108 opened in container 202, according to one embodiment of the present disclosure. Toolbar 500 may include lock indicator and selector 502, which may be used to indicate to a user whether particular application 108 is currently in a locked mode or an unlocked mode and may also be used to change from one mode to another. For example, icons on lock indicator and selector 502 may indicate which mode particular application 108 is currently in. A user may select the unlock icon to unlock previously locked application 108 and may select the lock icon to lock currently unlocked application 108.

Figure 5B:
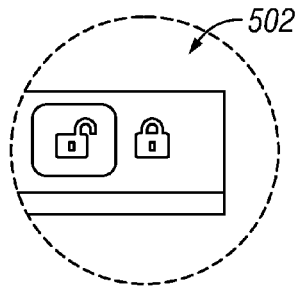
FIG. 5B illustrates an example embodiment of a lock indicator and selector indicating that a particular application opened in a container is in an unlocked mode, according to one embodiment of the present disclosure.

FIG. 5B illustrates an example embodiment of lock indicator and selector 502 indicating that particular application 108 opened in container 202 is in an unlocked mode, according to one embodiment of the present disclosure. In the illustrated embodiment, lock indicator and selector 502 indicates that particular application 108 opened in container 202 is in an unlocked mode with an image of an unlocked lock that is highlighted and an image of a locked lock that is not highlighted.

Figure 5C:
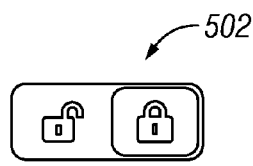
FIG. 5C illustrates an example embodiment of lock indicator and selector indicating that a particular application opened in a container is in a locked mode, according to one embodiment of the present disclosure.

FIG. 5C illustrates an example embodiment of lock indicator and selector 502 indicating that particular application 108 opened in container 202 is in a locked mode, according to one embodiment of the present disclosure. In the illustrated embodiment, lock indicator and selector 502 indicates that particular application 108 opened in container 202 is in a locked mode with an image of an unlocked lock that is not highlighted and an image of a locked lock that is highlighted.

Figure 6:
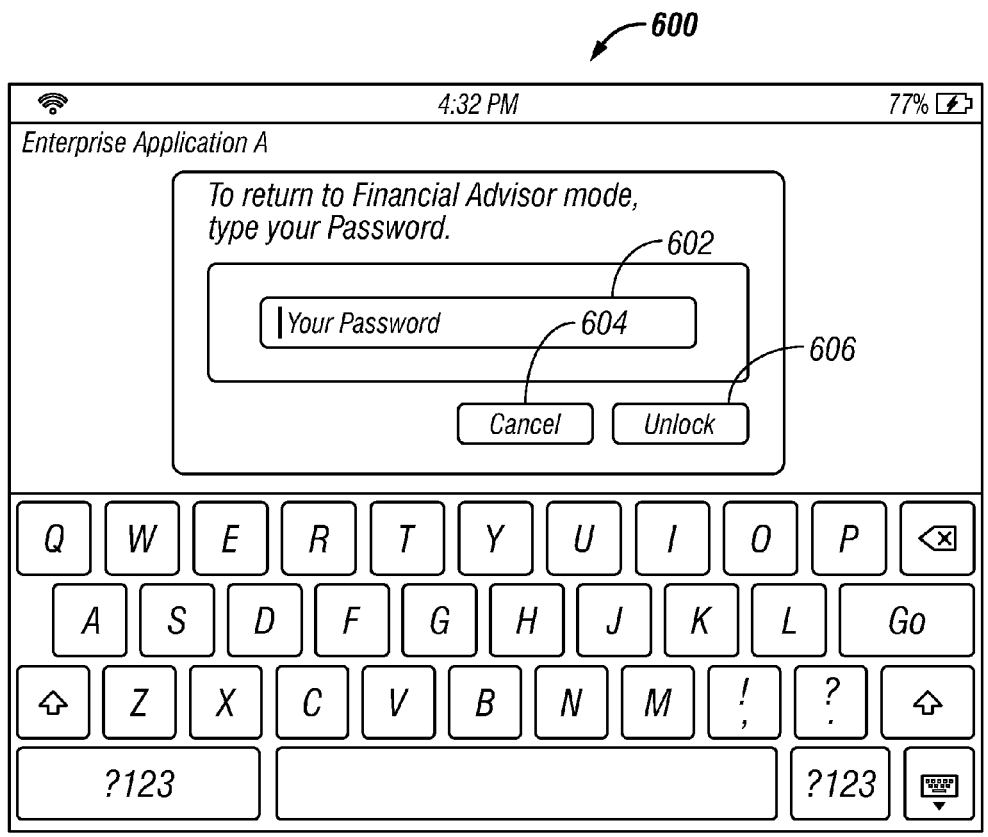
FIG. 6 illustrates an example embodiment of a GUI operable to allow a user to input credentials to unlock one or more particular applications, according to one embodiment of the present disclosure.

FIG. 6 illustrates an example embodiment of a GUI 600 operable to allow a user to input credentials to unlock one or more particular applications 108, according to one embodiment of the present disclosure. In certain embodiments, GUI 600 may be an example of GUI 106 of FIG. 1. GUI 600 may appear on mobile device 104 in response to a request to unlock particular application 108 in container 202. For example, a user may request to unlock particular application 108 by selecting an unlock icon such as the unlock icon of FIG. 5A. Additionally or alternatively, GUI 600 may appear on mobile device 104 in response to a request to unlock multiple particular applications 108 in container 202.

Password field 602 may be a field for entering a password associated with the user. The password may be a combination of letters, numbers, and/or symbols previously chosen by or assigned to the user. Cancel button 604 may be a button that the user may click or "press" in order to exit GUI 600 and leave the one or more applications 108 locked. Unlock button 606 may be a button that the user may click or "press," after selecting and/or entering information in password field 404 in order to prompt container 202 to process the entered information. Container 202 may process the entered information and may allow or deny unlocking of the particular one or more applications 108 or perform any suitable action.

Container 202 may be operable to allow unlocking of one or more applications 108 for a first user at a first time and deny unlocking of one or more applications 108 for a second user at a second time based on the entered information. For example, a first user may enter valid credentials and container 202 may, as a result, unlock one or more applications 108. After some time, mobile device 104 may be left idle or the first user may actively lock the one or more of the one or more applications 108 so that mobile device 104 locks the one or more applications 108. A second user may attempt to unlock the one or more locked applications 108 in container 202 by entering invalid credentials. As a result, container 202 may deny unlocking of the one or more locked applications 108.

Locked and unlocked applications 108 may be associated with one or more modes. For example, in the illustrated embodiment, the request to unlock "Enterprise Application A" may be associated with a request to "return to Financial Advisor mode." "Financial Advisor Mode" may be associated with the ability to view and interact with "Enterprise Application A" in a manner that may not be allowed in one or more other modes. For example, "Enterprise Application A" may have a "Presenter Mode" that is associated with being locked and may limit the interaction that a user may have with "Enterprise Application A." For example, a financial advisor may use "Enterprise Application A" on mobile device 104 as a tool to monitor and manage information for clients. The financial advisor may also wish to present information on mobile device 104, either on "Enterprise Application A" or on other applications 108 within container 202, to others without allowing others to have access to all functionality available in "Financial Advisor Mode." For that purpose, the advisor may lock "Enterprise Application A," which may change the mode to "Presenter Mode," for example. As another example, one or more applications 108 may enter a "Sleep Mode" when mobile device 104 is left idle for longer than a particular amount of time. If a user desires to use the application 108, mobile module 110 may require a security procedure and may display a GUI similar to GUI 600 to facilitate the security procedure. One or more applications 108 in container 202 may each have any number of available modes. Switching between modes may require a security procedure and mobile module 110 may use GUI 600 or any suitable GUI and/or performing the security procedure.

Modifications, additions, or omissions may be made to GUI 600 without departing from the scope of the disclosure. For example, GUI 600 may include more or fewer fields and/or buttons.

Figure 7:
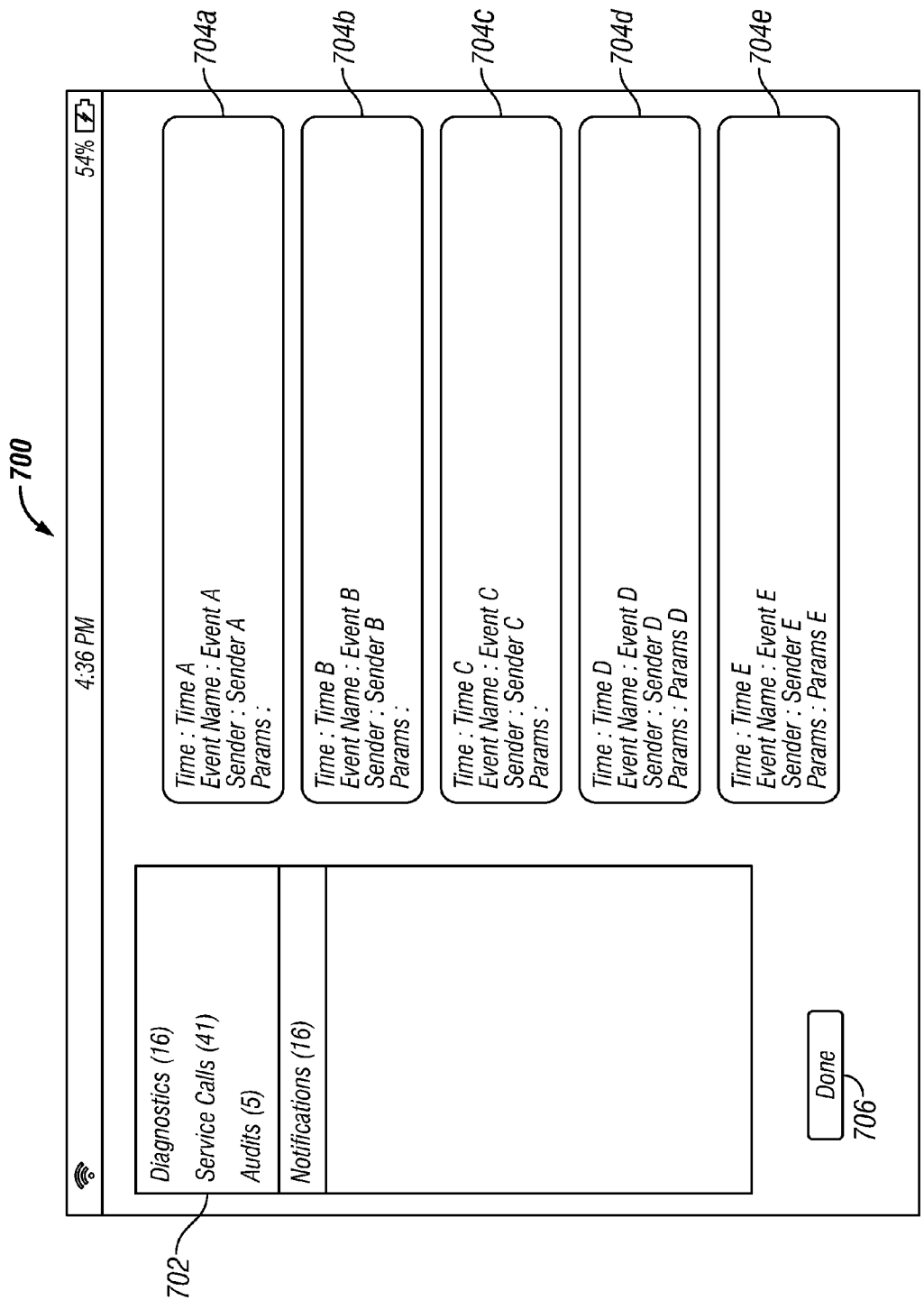
FIG. 7 illustrates an example embodiment of a GUI operable to allow display of a log of events occurring within container, according to one embodiment of the present disclosure.

FIG. 7 illustrates an example embodiment of a GUI 700 operable to allow display of a log of events occurring within container 202, according to one embodiment of the present disclosure. In certain embodiments, GUI 700 may be an example of GUI 106 of FIG. 1. Log menu 702 may be a menu allowing a user to choose between viewing diagnostics, service calls, audits, notifications, or any other suitable information. A user may select to view a particular category of information by hovering over or clicking on the name of the category in log menu 702. Log items 704 may display information associated with an event or any other suitable information. For example, in the illustrated embodiment, each log item 704 may display time, event name, sender, and parameters. Information on GUI 700 may allow for debugging of problems occurring within container 202. Done button 706 may allow a user to exit GUI 700 and return to a previous screen or to any other suitable display. Mobile module 110 may provide a capability to save logs like that shown in GUI 700 locally on the associated mobile device 104. GUI 700 may provide information useful for monitoring, analytics, reporting, debugging, or any other suitable function.

Modifications, additions, or omissions may be made to GUI 700 without departing from the scope of the disclosure. For example, GUI 700 may include more or fewer fields and/or buttons.

Figure 8:
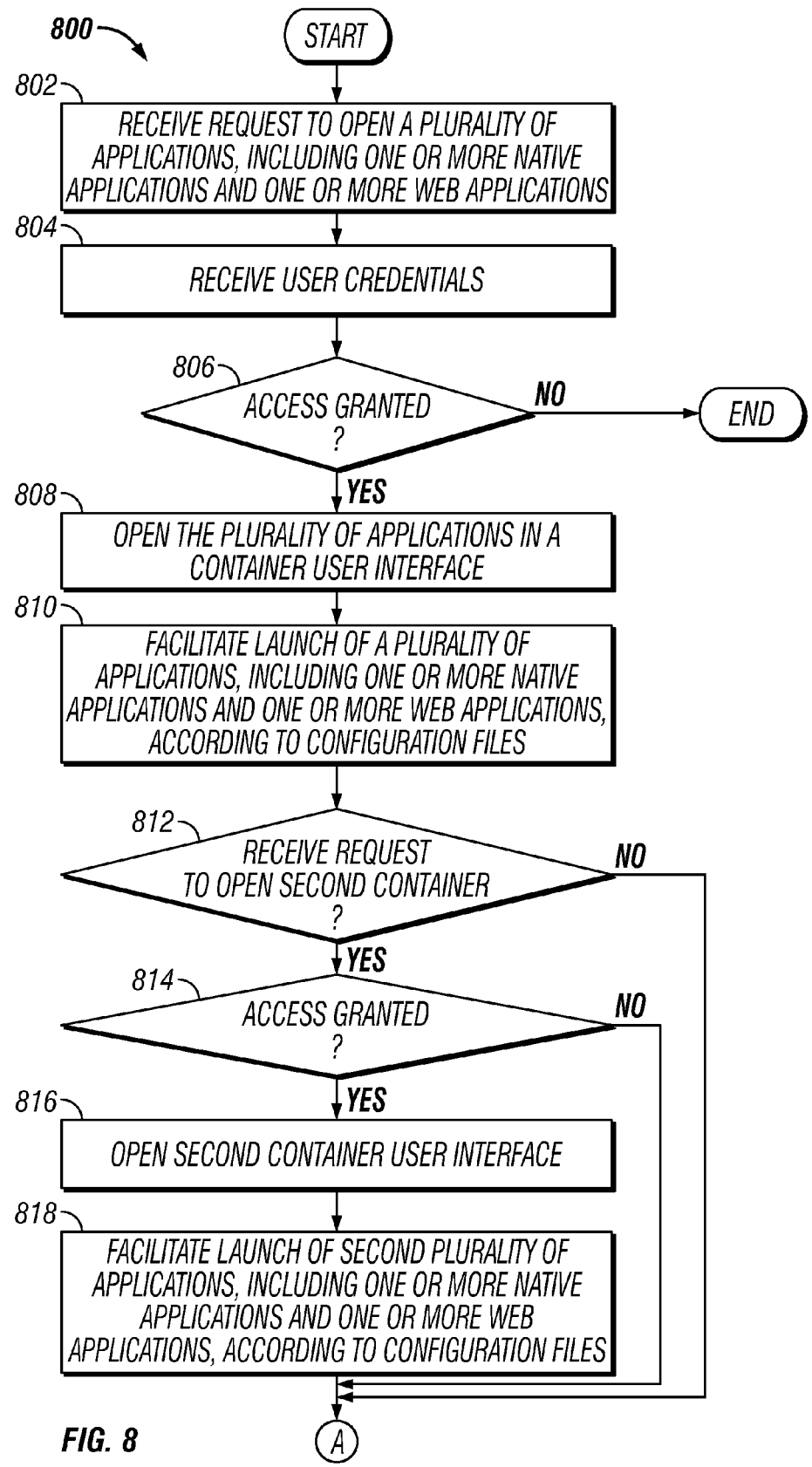
FIG. 8 illustrates a method for interfacing between various native and web applications, according to one embodiment of the present disclosure.

FIG. 8 illustrates method 800 for interfacing between various native and web applications 108, according to one embodiment of the present disclosure. The method begins at step 802 when mobile module 110 receives a request to open a plurality of applications 108, including one or more web applications 108 and one or more native applications 108, in container 202. For example, a user may request to open container 202 through an icon on GUI 106 of mobile device 104.

At step 804, mobile module 110 receives credentials associated with a user associated with mobile device 104. Credentials may include a username, password, domain, and any other suitable information. At step 806, mobile module 110 may determine, based on the received credentials, whether or not to grant access to open a plurality of native and web applications 108 in container 202. For example, mobile module 110 may compare the credentials to information stored in memory 118 in order to determine whether access should be granted. If mobile module 110 determines, based on the received credentials, not to grant access to container 202, the method may end. If mobile module 110 determines, based on the received credentials, to grant access to container 202, the method may continue at step 808.

At step 808, a main window is opened with a user interface that includes container 202. Mobile module 110 facilitates the launch of the plurality of native and web applications 108 within container 202 at step 810. Native and web applications 108 may be launched according to configuration files 212, which cause native and web applications 108 to be opened according to previous settings determined by the user or a business unit administrator. Native and web applications 108 may be configured in a particular layout within container 202. The settings of container 202 may be based on the user's role, the user's entitlements, the user's business unit, or any other suitable criteria for which to create the configuration settings. In the process of launching native and web applications 108, container 202 also launches additional features, such as toolbar 302, navigation menu 304, workspace 306, and application menu 308. The settings information may be cached for use with subsequent launches.

At step 812, mobile module 110 may receive a request to open a second plurality of applications 108 in a second container 203. The second plurality of applications 108 may include one or more web applications 108 and one or more native applications 108. If, at step 812, mobile module 110 receives a request to open a second plurality of applications 108 in a second container 203, the method may proceed to steps 814. If, at step 812, mobile module 110 does not receive a request to open a second container 203, the method may continue at step 820.

At step 814, mobile module 110 may determine, based on the previously received credentials, whether or not to grant access to open the second plurality of applications 108 in the second container 203. For example, mobile module 110 may compare the credentials to information stored in memory 118 in order to determine whether access should be granted to each of applications 108 in the second plurality of applications 108. If mobile module 110 determines, based on the received credentials, to grant access to second container 203, the method may continue at step 816. If mobile module 110 determines, based on the received credentials, not to grant access to the second container 203, the method may continue at step 820.

At step 816, a second window is opened with a user interface that includes second container 203. Mobile module 110 facilitates the launch of the second plurality of applications 108 within the second container 203 at step 818. Applications 108 may be launched according to configuration files 212, which cause applications 108 to be opened according to previous settings determined by the user or a business unit administrator. Applications 108 may be configured in a particular layout within the second container 203. The settings of the second container 203 may be based on the user's role, the user's entitlements, the user's business unit, or any other suitable criteria for which to create the configuration settings. In the process of launching applications 108, second container 203 also launches additional features, such as toolbar 302, navigation menu 304, workspace 306, and application menu 308. The settings information may be cached for use with subsequent launches.

At step 820, mobile module 110 determines the subscriptions associated with the launched applications 108, including those in the first container 202 and, if applicable, second container 203. Applications 108 may subscribe to an event to receive an update in context information. Subscribing to events causes updates to be sent to a plurality of different native and web applications 108 among different business units. Therefore, information integration may occur between various applications 108. Each event subscription is monitored at step 822. At step 824, mobile module 110 determines whether a change has occurred with any event. If a change has occurred with any event, the method continues at step 826. If no change has occurred to any event, the method may continue at step 828. If a change has occurred with any event, mobile module 110 updates context information associated with the event subscription at step 826. Each active application 108 that has subscribed to the event will receive the update. Inactive applications 108 may receive event updates upon becoming active. Otherwise, the method proceeds to step 828.

At step 828, mobile module 110 determines whether a lock-triggering event occurs. For example, a user may indicate a request to lock application 108 in container 202. As another example, mobile device 104 may be left idle for greater than a particular amount of time. Mobile module 110 may determine that either of these, or any other suitable event, is a trigger event. If mobile module 110 determines that a trigger event has occurred, the method may continue at step 830. If mobile module 110 does not determine that a trigger event has occurred, the method may continue at step 840.

At step 830, mobile module 110 may lock one or more applications 108, by denying access to the one or more applications 108, in response to determining that a lock-triggering event has occurred. Mobile module 110 may deny access to applications 108 within the affected container 202. Alternatively, mobile module 110 may continue to allow access to one or more other applications 108 within the affected container 202 while denying access to others. For example, a user may choose to lock particular applications 108 and not others. This may be useful if a user wants to allow another person to use their mobile device 104 and have access to some applications 108 and not others. For example, a financial advisor may use mobile device 104 to open a plurality of applications 108 in a container 202. One or more applications 108 may contain sensitive information about one or more of the financial advisor's clients. The financial advisor may wish to show one of applications 108 to a particular client while keeping other applications 108 from the view of and/or other possible access by the particular client. The financial advisor may choose to indicate a request to lock the other applications 108 while keeping the one of applications 108 unlocked for the client to view. Mobile module 110 may lock all but the one of applications 108. Financial advisor may then hand mobile device 104 to the client for view and/or other access, knowing that the client will be unable to view or otherwise access lock applications 108.

At step 832, mobile module 110 may receive a request to access one or more of the one or more locked applications 108. For example, a user may hover over or click on an icon representing one or more of the one or more locked applications 108. If mobile module 110 receives such a request, the method may continue at step 834. If mobile module 110 does not receive such a request, the method may continue at step 840.

At step 834, mobile module 110 may receive credentials. For example, in response to the request to access one or more of the one or more locked applications 108, mobile module 110 may prompt entry of credentials by displaying a GUI, such as GUI 600, and may receive credentials for use in a security procedure to determine whether the request should be granted. Credentials may include a username, password, domain, and any other suitable information.

At step 836, mobile module 110 may determine whether to grant access to one or more of the one or more locked applications 108. For example, mobile module 110 may perform a security procedure by comparing the received credentials to information stored in memory 118 or by performing any other suitable operations, to determine whether or not to grant access. Information stored in memory for comparison may indicate credentials associated with users allowed access to one or more of the one or more locked applications 108. If mobile module 110 decides to grant access, the method may continue at step 838. If mobile module 110 decides not to grant access, the method may continue at step 832.

At step 838, mobile module 110 may grant access to one or more of the locked applications 108. For example, GUI 106 may change so that one or more of the locked applications 108 go from locked to unlocked. The method may continue at step 840.

At step 840, mobile module 110 may determine whether a request is received to detach application 108 from container 202. If this request is made, mobile module 110 may remove application 108 from the interface of container 202 and application 108 may float outside container 202 at step 842. When application 108 floats outside container 202, application 108 is inactive and does not receive updates regarding event subscriptions. In this embodiment, container 202 continues to control application 108, but application 108 is not visible on container 202.

If a request to detach application 108 is not received, the method continues to step 844, where it is determined whether a request to synch application 108 with container 202 is received. If a user requests to synch application 108 with container 202, container 202 synchs up application 108 and container 202 and activates application 108 inside container 202. Upon synching up, application 108 becomes visible on container 202 at step 846. If a user does not request to synch application 108 with container 202, it is determined at step 848 whether a request is received to close container 202. If a user does not close container 202, the method continues from step 822 where mobile module 110 continues to monitor each event subscription. Otherwise, the method ends.

Modifications, additions, or omissions may be made to method 800 disclosed herein without departing from the scope of the disclosure. The method may include more, fewer, or other steps. For example, the method may include granting, at a first time and to a first user, access to one or more applications 108 in container 202 and denying, at a second time and to a second user, access to one or more applications 108 in container 202, based on information entered during a first and second security procedure. As another example, applications 108 may subscribe to other events from which to receive updates. Additionally, steps may be performed in parallel or in any suitable order. For example, a lock-triggering event at step 828 may occur before a request to open a second container at step 812. Additionally, steps in FIG. 8 may be performed in parallel or in any suitable order.

Certain embodiments of the disclosure may provide one or more technical advantages. A technical advantage of one embodiment includes providing a common interface between native and web applications and the platform. By providing this common interface, standard patterns of application development may be provided, which reduces costs and improves efficiency. The common interface also provides an intuitive way to manage application windows and application content for multiple types of business applications, including both web and native applications. Accordingly, a user may navigate and control a number of native and web applications simultaneously. Another technical advantage of an embodiment includes improving technology integration across various business applications and enabling the consolidation and convergence of various platforms. As mentioned above, this consolidation improves development operations by reducing costs and increasing efficiency. Yet another technical advantage of an embodiment includes supporting communication between applications. Native and web applications share information on the mobile device rather than involving a server, which improves performance and decreases the load on the server and the network. Another technical advantage of an embodiment comprises providing a single, consolidated deployment infrastructure for various platforms. Another advantage includes storing a local log on the device to allow for troubleshooting. Another advantage includes allowing locking one or more applications while keeping one or more other applications active. This may allow users to manage which applications they would like displayed and/or otherwise available to others while still keeping other applications open in the container. This may provide additional security for users who would like to present some information and/or functionality in the container. This may also limit processing resources of otherwise needing to close applications for security and later restart the same application for access by the user. This may also allow for the improved efficiency of the container to be maintained by allowing locked applications, although securely locked, to remain in the container to interface and update along with other applications.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for interfacing between a plurality of applications for display on a mobile device comprising:
   receiving, by an interface, a request to open a plurality of applications, the plurality of applications being associated with a ,plurality of business units and comprising one or more native applications and one or more web applications, the native applications being downloaded on a mobile device and the web applications being accessed remotely by the mobile device;
   opening, by a processor communicatively coupled to the interface, the plurality of applications in a container according to a configuration file, the container being operable to be displayed on a user interface of the mobile device;
   receiving, by the interface, a request to display a log of events occurring within the container;
   in response to the request to display a log of events, displaying one or more log items to facilitate debugging problems occurring within the container, the one or more log items each associated with an event occurring within the container;
   receiving, by the interface, a request to lock at least one of the plurality of applications in response to the container and the at least one application being idle for a specific amount of time;
   in response to the request to lock:
     locking the at least one of the plurality of applications;
     moving the at least one of the plurality of applications to the background of the container;
     denying functional access to the at least one of the plurality of applications until the at least one application becomes unlocked; and
     presenting information associated with the at least one of the plurality of applications for display.

2. The method of claim 1, further comprising:
   determining that a lock-triggering event has occurred;
   denying, in response to determining that the lock-triggering event has occurred, access to one or more of the plurality of applications;
   receiving a request to access the one or more of the plurality of applications;

performing, in response to receiving the request to access the one of more of the plurality of applications, a security procedure; and granting, in response to performing the security procedure, access to the one or more of the plurality of applications.

3. The method of claim 2, wherein the one or more of the plurality of applications is fewer than the plurality of applications.

4. The method of claim 1, further comprising:
receiving, by the interface, credentials of a user associated with the mobile device;
determining, by the processor and based on the credentials of the user associated with the mobile device, permission to access the plurality of applications;
determining, by the processor and based on the credentials of the user associated with the mobile device, permission to access a second plurality of applications; and
opening, by the processor, the second plurality of applications in a second container.

5. The method of claim 1, further comprising:
determining, by the processor, an event subscription associated with each application of the plurality of applications;
determining, by the processor, whether an event changes context information associated with the event subscription; and
updating, by the processor, each application of the plurality of applications to indicate updated context information associated with the event subscription if the event changes the context information associated with the event subscription.

6. The method of claim 1, wherein opening the plurality of applications in the container according to the configuration file comprises arranging the plurality of applications in a particular layout in the container according to the configuration file.

7. The method of claim 1, further comprising:
determining whether a request is received to activate an application in the container;
activating the application in the container if the request to activate an application in the container is received;
determining an event subscription associated with the activated application;
determining whether an event changes context information associated with the event subscription; and
updating the activated application to indicate updated context information associated with the event subscription if the event changes the context information associated with the event subscription.

8. A non-transitory computer readable medium comprising logic for interfacing between a plurality of applications for display on a mobile device, the logic, when executed by a processor, operable to:
receive a request to open a plurality of applications, the plurality of applications being associated with a plurality of business units and comprising one or more native applications and one or more web applications, the native applications being downloaded on a mobile device and the web applications being accessed remotely by the mobile device; open the plurality of applications in a container according to a configuration file, the container being operable to be displayed on a user interface of the mobile device;
receive a request to display a log of events occurring within the container;
in response to the request to display a log of events, display one or more log items to facilitate debugging problems occurring within the container, the one or more log items each associated with an event occurring within the container;
receive a request to lock at least one of the plurality of applications in response to the container and the at least one application being idle for a specific amount of time;
in response to the request to lock:
lock the at least one of the plurality of applications;
move the at least one of the plurality of applications to the background of the container;
deny functional access to the at least one of the plurality of applications until the at least one application becomes unlocked; and
present information associated with the at least one of the plurality of applications for display.

9. The medium of claim 8, the logic further operable to:
determine that a lock-triggering event has occurred;
deny, in response to determining that the lock-triggering event has occurred, access to one or more of the plurality of applications;
receive a request to access the one or more of the plurality of applications;
perform, in response to receiving the request to access the one of more of the plurality of applications, a security procedure; and
grant, in response to performing the security procedure, access to the one or more of the plurality of applications.

10. The medium of claim 9, wherein the one or more of the plurality of applications is fewer than the plurality of applications.

11. The medium of claim 8, the logic further operable to:
receive credentials of a user associated with the mobile device;
determine, based on the credentials of the user associated with the mobile device, permission to access the plurality of applications;
determine, based on the credentials of the user associated with the mobile device, permission to access a second plurality of applications; and
open the second plurality of applications in a second container.

12. The medium of claim 8, the logic further operable to:
determine an event subscription associated with each application of the plurality of applications;
determine whether an event changes context information associated with the event subscription; and
update each application of the plurality of applications to indicate updated context information associated with the event subscription if the event changes the context information associated with the event subscription.

13. The medium of claim 8, wherein opening the plurality of applications in the container according to the configuration file comprises arranging the plurality of applications in a particular layout in the container according to the configuration file.

14. The medium of claim 8, the logic further operable to:
determine whether a request is received to activate an application in the container;
activate the application in the container if the request to activate an application in the container is received;
determine an event subscription associated with the activated application; determine whether an event changes context information associated with the event subscription; and update the activated application to indicate updated context information associated with the event subscription if the event changes the context information associated with the event subscription.

15. A mobile module for interfacing between a plurality of applications for display on a mobile device, comprising:

an interface operable to:

receive a request to open a plurality of applications, the plurality of applications being associated with a plurality of business units and comprising one or more native applications and one or more web applications, the native applications being downloaded on a mobile device and the web applications being accessed remotely by the mobile device;

a hardware processor communicatively coupled to the interface and operable to:

open the plurality of applications in a container according to a configuration file, the container being operable to be displayed on a user interface of the mobile device;

receive, by the interface, a request to display a log of events occurring within the container;

in response to the request to display a log of events, display one or more log items on a graphical user interface to facilitate debugging problems occurring within the container, the one or more log items each associated with an event occurring within the container;

receive, by the interface, a request to lock at least one of the plurality of applications in response to the container and the at least one application being idle for a specific amount of time;

in response to the request to lock:

lock the at least one of the plurality of applications;

move the at least one of the plurality of applications to the background of the container;

deny functional access to the at least one of the plurality of applications until the at least one of the plurality of applications becomes unlocked; and present information associated with the at least one of the plurality of applications for display.

16. The module of claim 15, wherein the hardware processor is further operable to:

determine that a lock-triggering event has occurred; and deny, in response to determining that the lock-triggering event has occurred, access to one or more of the plurality of applications;

wherein the interface is further operable to receive a request to access the one or more of the plurality of applications; and wherein the hardware processor is further operable to:

perform, in response to receiving the request to access the one or more of the plurality of applications, a security procedure; and grant, in response to performing the security procedure, access to the one or more of the plurality of applications.

17. The module of claim 16, wherein the one or more of the plurality of applications is fewer than the plurality of applications.

18. The module of claim 15, wherein the interface is further operable to receive credentials of a user associated with the mobile device; and wherein the hardware processor is further operable to:

determine, based on the credentials of the user associated with the mobile device, permission to access the plurality of applications;

determine, based on the credentials of the user associated with the mobile device, permission to access a second plurality of applications; and open the second plurality of applications in a second container.

19. The module of claim 15, wherein the hardware processor is further operable to:

determine an event subscription associated with each application of the plurality of applications;

determine whether an event changes context information associated with the event subscription; and update each application of the plurality of applications to indicate updated context information associated with the event subscription if the event changes the context information associated with the event subscription.

20. The module of claim 15, wherein open the plurality of applications in the container according to the configuration file comprises arranging the plurality of applications in a particular layout in the container according to the configuration file.

* * * * *